Sept. 17, 1963     H. J. AYRES ET AL     3,103,811
APPARATUS FOR TESTING WELLS
Filed Jan. 19, 1960     4 Sheets-Sheet 1

INVENTORS.
HUGH J. AYRES
PAT T. W. CHISHOLM
BY
Earl Babcock

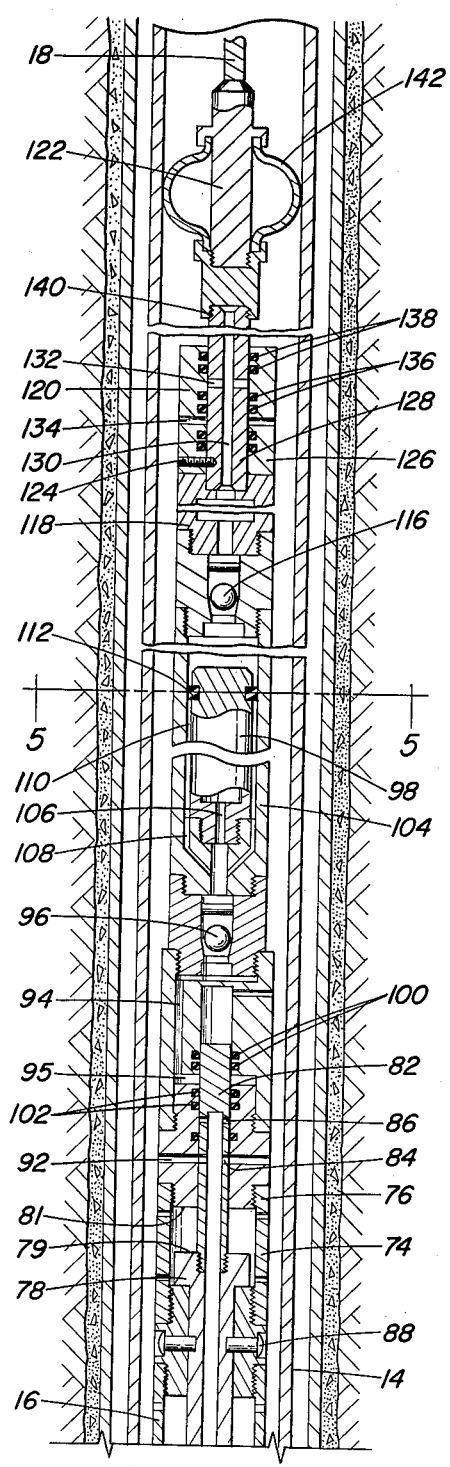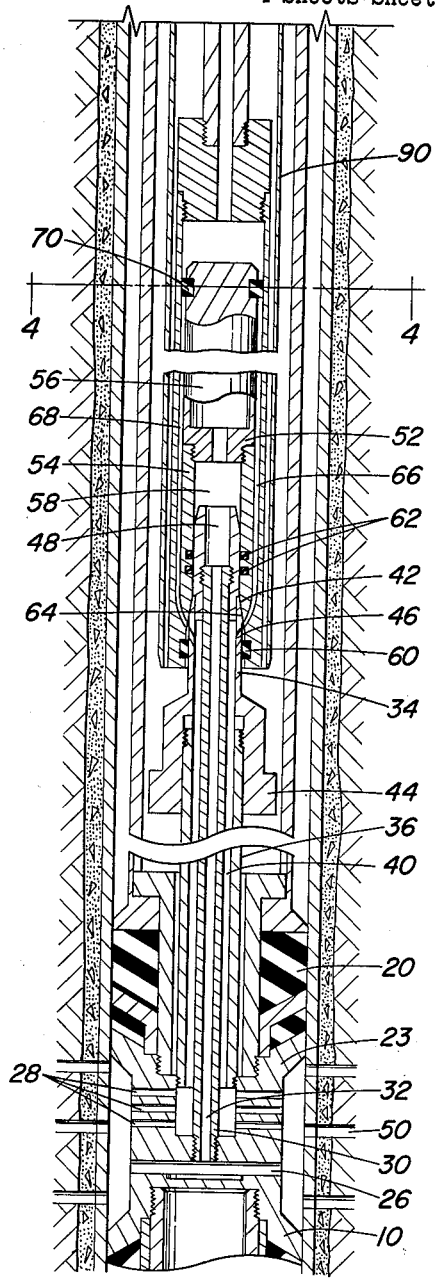
FIG. 2
FIG. 2A
INVENTORS.
HUGH J. AYRES
PAT T. W. CHISHOLM
BY
Earl Babcock

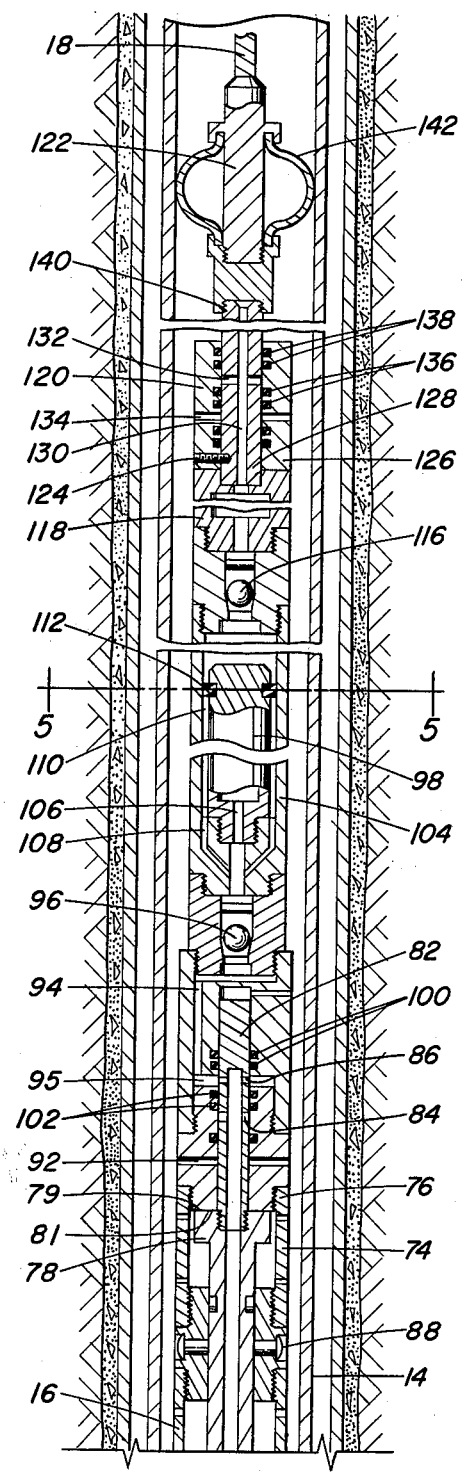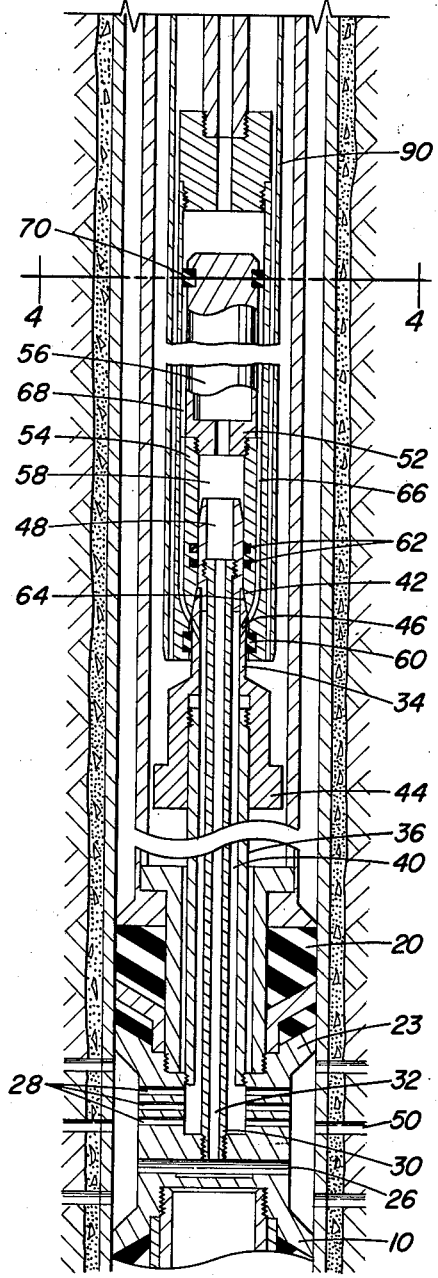
FIG. 3
FIG. 3A
INVENTORS.
HUGH J. AYRES
PAT T. W. CHISHOLM
BY
Earl Babcock INVENTORS.
HUGH J. AYRES
PAT T. W. CHISHOLM
BY
Earl Babcock

United States Patent Office 3,103,811
Patented Sept. 17, 1963

3,103,811
APPARATUS FOR TESTING WELLS
Hugh J. Ayres and Pat T. W. Chisholm, Duncan, Okla., assignors to Halliburton Company, a corporation of Delaware
Filed Jan. 19, 1960, Ser. No. 3,457
2 Claims. (Cl. 73—152)

This invention relates generally to apparatus for testing formations or zones in an oil or gas well or the like.

More particularly, it relates to apparatus for obtaining dual pressure recordings and samples of fluid produced by successively isolated formations in an oil or gas well or the like.

Apparatus used for testing have, in the past, been primarily of the type run into the well on a tubing or running-in string. It is necessary with this arrangement to either reciprocate or rotate the running-in string to operate the testing apparatus. Additionally, with this arrangement the entire running-in string has to be removed from the well to obtain the results of the test. If it is desired to test several zones, a round trip has to be made with the running-in string for each test desired. This method is very time consuming and expensive.

More recently, testing apparatus has been developed which may be run on a wire line, thereby obviating the necessity for making a round trip with the running-in string. However, certain of the wire line arrangements involved using an electrical cable, the testing device being run on a conductive line because it contains an explosive charge which must be actuated. Also, the wire line arrangements heretofore employed are commonly capable of obtaining a pressure recording from the formation only if the formation is actually producing fluid. This is normally referred to as a flow pressure recording. When using wire line testing equipment, the flow pressure recording is obtained by allowing the formation to produce fluid into some type of chamber provided in the testing apparatus. The fluid so produced contains certain insoluble materials which tend to clog the flow passage leading into the chamber, and when this clogging occurs the pressure recording will be erroneous.

Due to the erroneous results often obtained using only flow pressure recordings, a second pressure recording device which does not depend upon flow of formation fluid to obtain a pressure recording is generally incorporated in the apparatus. This device or gauge is known as a blanked-off gauge and is inserted in the testing apparatus in a closed system that is sensitive to pressure changes in the well.

The inclusion of the blanked-off gauge into testing apparatus that is run into the well on a running-in string has been accomplished with little difficulty, but its inclusion in wire line testing apparatus has not heretofore been possible.

A general object of this invention is to provide an improved apparatus for testing formations or zones in an oil or gas well or the like.

Another object of this invention is to provide an improved apparatus wherein a plurality of zones or formations may be tested without removing the running-in string from the well.

A further object of the invention is to provide apparatus wherein a plurality of isolated zones or formations in an oil or gas well or the like may be independently tested without removing the running-in string from the well.

This invention provides a method of obtaining from successively isolated formations a sample of formation fluid, a pressure recording as the sample is produced, and a pressure recording independent of the production of fluid. It also provides an arrangement and construction of apparatus for isolating and testing formations wherein both dual pressure recordings and a sample from the isolated formation is obtained after running the testing device into the oil or gas well or the like on a wire line.

The foregoing and additional objects and advantages of the invention will become more apparent from the following description when read in conjunction with the accompanying drawing wherein similar reference characters denote similar parts in all views and wherein:

FIGURES 1 and 1a taken together comprise a longitudinal cross-sectional view of well apparatus having the invention incorporated therein, the apparatus including a packer assembly shown set or expanded at a desired location in a cased and perforated well bore and, above the packer assembly, also including a testing tool assembly shown in elevation suspended in the well on a wire line, the parts of the apparatus being shown in the respective positions occupied by them at one stage during the performance of a testing operation.

FIGURES 2 and 2a taken together comprise an enlarged longitudinal cross-sectional view of the upper portion of the packer assembly and of the testing tool assembly showing the parts of the apparatus in the respective positions occupied by them upon the initial engagement of the testing tool assembly with the packer assembly.

FIGURES 3 and 3a taken together comprise a view similar to FIGURE 2 but showing the parts of the apparatus in the respective positions occupied by them during the sampling stage of the testing operation.

FIGURE 5 is a cross-sectional view taken along line 5—5 of FIGURE 2a.

Figure 1:
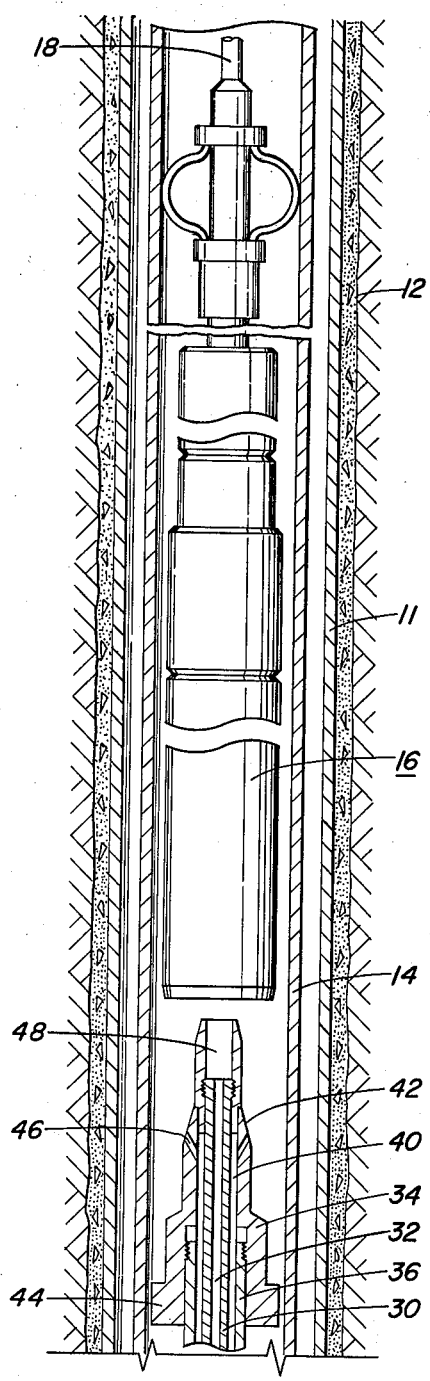
Figure 1A:
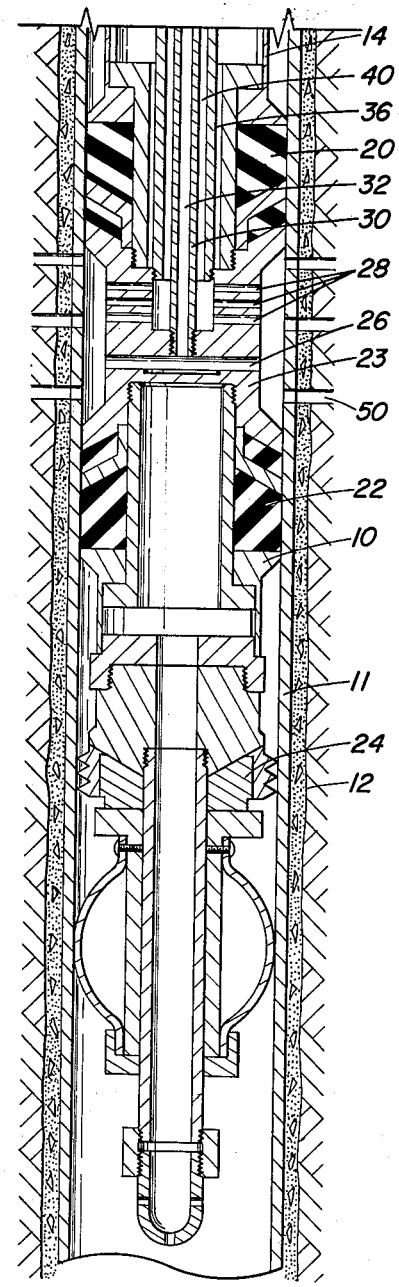

Referring first to FIGURES 1 and 1a, a well packer assembly 10 is shown set in a perforated casing 11 in a well bore 12. A tubing 14 extends upwardly from the packer assembly 10 to the surface of the well. A testing tool assembly 16 is shown suspended above the packer assembly 10 on a wire line 18. Perforations 50 extend through the casing 11 into the formation to be tested permitting formation fluids to flow therethrough. With appropriate packer and slips provided, the apparatus may be run either in open hole or in casing.

The packer assembly 10 includes upper and lower packers 20 and 22 respectively, which are spaced apart by a member 23, and an anchor assembly 24 adapted to firmly engage the casing 11 whereby the packers 20 and 22 may be deformed into sealing engagement therewith. The member 23 is provided with large passageways 26 and a plurality of ports 28, all extending through the side wall thereof.

A tube 30 is arranged whereby its interior 32 is in communication with the passageways 26 and extends upwardly through the upper packer 20 terminating in guide nose 34. A second tube 36 is arranged whereby its interior is in communication with ports 28. The second tube 36 encircles the tube 30 forming an annular space 40 and extends upwardly also terminating in the guide nose 34. The guide nose 34 is provided with an exterior tapered shoulder 42, a centralizing and supporting flange 44, ports 46 extending through the shoulder 42 into the annular space 40, and a passageway 48 which is in communication with the interior 32 of the tube 30.

The testing tool assembly 16, shown in cross section in FIGURES 2, 2a, 3, and 3a, includes four major components.

The first of these components is a blanked-off pressure recording assembly 52 and includes a hollow member 54 and a pressure recording device or gauge 56.

The lower interior and portion 58 of the member 54 carries a seal 60 and O-type seals 62. Between the seals 60 and 62, a tapered surface 64 is provided which is a companion surface to the tapered shoulder 42. The seal 60 is in sealing engagement with the guide nose 34 below the ports 46 and the seals 62 are in sealing engagement therewith between the ports 46 and the passageway 48. Passageways 66 extend through the surface 64 and longitudinally through the wall of the member 54 to an annular space 68 surrounding the pressure recording device 56.

Figure 4:
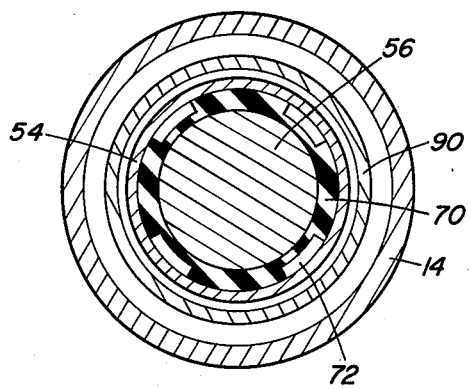
FIGURE 4 is a cross-sectional view taken along line 4—4 of FIGURE 2.

A centralizing member 70, preferably constructed of a resilient material, encircles the upper portion of the gauge 56. FIGURE 4 shows grooves 72 in the outer periphery of the centralizer 70 permitting fluid flow thereby.

The second major component of the testing tool assembly 16 is a sliding valve 74 which includes an outer valve member 76 and a hollow inner valve member 78 slidably mounted in the outer valve member 76.

The inner valve member 78 is connected at its lower end to the upper end of the hollow member 54 by threads 80. An upwardly facing exterior shoulder 79 is provided on the member 78 for purposes which will be more fully explained hereinafter. The upper end of the inner valve member 78 is closed at 82. Ports 84 and 86 extend through the side wall of the inner valve member. Yieldable pins 88 initially hold the parts of the sliding valve 74 in the respective positions shown in FIGURE 2. The sliding valve 74 is hydrostatically balanced and the pins 88 serve to make certain that the valve 74 is not inadvertently opened.

The outer valve member 76 has a tube-like lower extension 90 which encircles a lower portion of the inner valve member 78 and the hollow member 54 and gauge 56. Ports 92 in the outer valve member 76 are initially aligned with ports 84 in the inner valve member 78 whereby fluid may flow from the interior thereof to the exterior of the outer valve member 76. An interior shoulder 81 located just below the ports 92 is provided for purposes which will be more fully explained hereinafter. Passageway 94 permits fluid communication from the interior of the outer valve member 76 through an opening 95 therein upwardly to a ball check valve 96 located just below an upper or flow gauge case 98. O-type seals 100 and 102 encircle the exterior of the inner valve member 78 and are located respectively above and below the opening 95.

Figure 5:
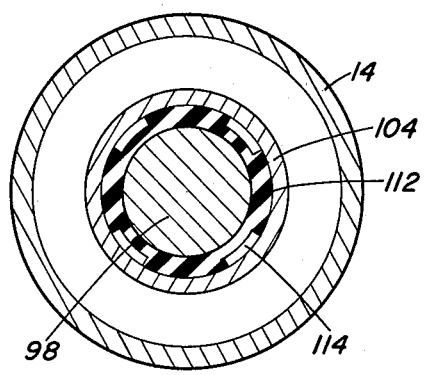

The third component of the testing tool assembly 16 is an upper or flow pressure recording assembly 104. It includes the pressure recording device or gauge 98, and the ball check valve 96. Fluid flowing upwardly through the check valve 96 acts upon the gauge 98 through a passageway 106. As flow continues, the fluid is diverted through passageways 108 into an annular space 110 surrounding the gauge 98. A centralizer 112, similar to centralizer 70, encircles the gauge 98. Flow passages 114 in the centralizer 112 are more clearly shown in FIGURE 5.

The fourth component of the testing tool assembly 16 includes ball check valve 116, one or more hollow sample barrels 118, a pressure release valve 120 located above the uppermost barrel, and a retrieving mechanism 122.

The check valve 116 is located below the lower barrel 118 and prevents flow therefrom while permitting flow thereinto. In actual practice, a check valve of this type will be located between every third or fourth barrel as desired. Any number of barrels 118 may be used depending on the quantity of sample desired.

The pressure release valve 120 includes a set screw 124 adapted to prevent movement of a slidable exterior sleeve 126 on a hollow inner mandrel 128. The interior 130 of the inner mandrel 128 is in communication with the interior of the sample barrels 118. Ports 132 extend through the well of the inner mandrel 128. Ports 134 extend through the wall of the sleeve 126. O-type seals 136 and 138 carried in the sleeve 126 isolate the ports 132.

A retrieving mechanism 122 is attached, as by threads 140, to the upper end of the inner mandrel 128. As shown, this mechanism includes a centralizer 142 and is arranged and constructed for connection to a wire line 18 or other lowering and retrieving apparatus (not shown).

Although many threaded connections are shown in the drawing, most of them are for assembly of the apparatus and for this reason are not given reference numerals. Additionally, many ports are also shown but not numbered because they are present only to prevent pressure traps during the movement of certain parts in the operation of the testing apparatus.

In the operation of apparatus constructed in accordance with this invention, the packer assembly 10 is attached to a string of tubing 14 and lowered therewith into the cased well bore 12. When the packer assembly 10 reaches the proper location, such as straddling the perforations 50, the packers 20 and 22 are expanded into sealing engagement with the casing 11, thus isolating the zone to be tested. The formation produces fluid through the perforations 50. The fluid, thus produced, then enters the passageways 26 and flows upwardly through the interior 32 of the tube 30 and into the interior of the tubing 14 through the passageway 48 of the guide nose 34. Simultaneously, the fluid also enters the ports 28 and flows upwardly through the annular space 40 and into the interior of the tubing 14 through the ports 46 of the guide nose 34.

The testing tool assembly 16 is then lowered into the interior of the tubing 14 on a wire line 18 or it may be dropped thereinto free of any lowering device. As the testing tool assembly 16 passes downwardly through the tubing 14, the ports occupy the relative positions shown in FIGURE 2.

Upon contacting the guide nose 34 of the packer assembly 10, the seal 60 engages the exterior of the guide nose 34 below the tapered shoulder 42 and the O-type seals 62 sealably engage the exterior of the guide nose 34 above the tapered shoulder 42. Thus, it may be seen in FIGURES 2 and 3 that the passageways 46 are isolated from the interior of the tubing 14 by the seals 60. The O-type seals 62 isolate passageways 46 from the passageway 48 thereby providing two separate and distinct flow passages to the testing tool assembly 16 from the packer assembly 10.

The lower portion of the testing assembly 16 contains the blanked-off pressure recording device or gauge 56. The recording device 56 is always exposed to the pressure within the hollow member 54. When the seals 60 and 62 are in engagement with the guide nose 34, it is apparent that the blanked-off pressure recording device 56 will be exposed to the pressure of the fluid in the interior 32 of the tube 30.

When the testing tool assembly 16 contacts the guide nose 34, it continues its downward movement until the inner tapered surface 64 of the hollow member 54 engages the tapered shoulder 42 of the guide nose 34. Due to the weight of the testing tool assembly, the yieldable pins 88 shear and the testing tool assembly 16 with the exception of the hollow member 54, the gauge 56, and the inner valve member 78 continues to move downwardly. Downward movement of the remainder of the testing tool assembly 16 is terminated when the exterior shoulder 79 of the inner valve member 78 abuts the interior shoulder 81 of the outer valve member 76 as shown in FIGURE 3. With the various parts in the relative positions shown in FIGURES 3 and 3a, the ports 86 in the inner valve member 78 are in alignment with the opening 95 of the outer valve member 76.

Fluid flows from the annular space 40 through the ports 46 into the passageways 66 in the hollow member 54 and thence into the annular space 68 surrounding the gauge 56. The fluid then flows through the grooves 72 (shown in FIGURE 4) upwardly through the inner valve member 78 and, when the parts are in the relative positions shown in FIGURES 2 and 2a, outwardly through the ports 84 and 92 into the interior of the tubing 14. When the parts are in the relative positions shown in FIGURES 3 and 3a, the fluid flows through the inner valve member 78, through the ports 86 into the opening 95 and thence through the passageway 94 into the ball-check valve 96.

After passing through the check valve 96, the fluid is diverted through the passageways 108 into the annular space 110 surrounding the upper flow-gauge 98. The fluids acts upon the flow-pressure recording device 98 through the passageway 106.

Fluid then flows through the grooves 114 in the centralizing member 112 (see FIGURE 5) through the ball-check valve 116 and thence into the sample chamber or chambers 118.

The check valves 96 and 116 are provided to prevent loss of the fluid from the sample chamber upon disassembly of the testing tool assembly 16.

After the desired test has been made, the testing tool assembly 16 is retrieved from the well by wire line 18 or other suitable means. Upon lifting the testing tool assembly 16, the parts return to the relative positions shown in FIGURES 2 and 2a, thereby preventing additional fluid from reaching the upper or flow-pressure recording device 98. It should be pointed out, however, that the lower or blanked-off pressure recording device 56 is continuously exposed to the pressure of fluid in the interior of the hollow member 54.

Upon reaching the surface, the testing tool assembly 16, is disassembled and the yieldable pins 88 replaced. The pressure in the sample chambers is relieved by loosening the set screw 124 and sliding the exterior sleeve 126 on the hollow inner mandrel 128 until the ports 132 and 134 are in alignment thus venting the interior of the sample chambers 118 through the interior 130 of the inner mandrel 128 to the atmosphere. The fluid sample is actually removed from the sample chamber 118 by inserting a long slender device, such as a screwdriver, into the lower end thereof moving the ball-check valve 116 to its open position.

To run subsequent tests it is only necessary to reassemble the testing tool assembly 16, unseat the packer assembly 10, move it to the formation or zone desired, reseat the packer assembly 10, and rerun the testing tool assembly 16 as previously described.

Thus, it may be seen that a considerable saving in time and money is accomplished by eliminating the necessity of removing the entire testing apparatus to perform tests on subsequent zones. It is also a very important advantage in testing apparatus run on a wire line to be able to run both a flow-pressure recording device and a blanked-off pressure recording device. It can be seen immediately upon examination of the records made by the pressure recording devices 56 and 98 whether or not a valid test was obtained. If not, the testing tool assembly 16 may be rerun without unseating the packer assembly 10 and another test obtained of the same zone. If a valid test was obtained, then subsequent tests may be made as described.

Only one embodiment of the invention has been shown for the purpose of illustration and it should be obvious that many variations therefrom or modifications thereto may be made without departing from the spirit of the invention or the scope of the annexed claims.

We claim:

1. A well testing apparatus comprising:

a packer assembly adapted to be lowered into a well on tubing or the like to isolate a zone to be tested, said packer assembly having packer means for segregating said zone from the portion of the well thereabove;

a testing tool assembly adapted to be moved on a wire line through said tubing to an operative position adjacent said packer assembly;

conduit means carried by one of said assemblies, said conduit means being axially engageable with said other assembly as said tool assembly reaches said operative position;

axially engageable coupling means for placing said conduit means carried by said one of said assemblies and said other assembly in fluid communication;

said conduit means, in said operative tool assembly position, passing from said zone, through said packer means to said tool assembly to place said zone and said tool assembly in fluid communication;

said conduit means including a tubular, axially extending passage, and an annular passage extending coaxially with but separate from and surrounding said tubular passage;

means forming a sample receiving chamber in said testing tool assembly;

means within said tool assembly forming a first fluid passageway having an inlet in fluid communication with said zone by way of said annular passage of said conduit means when said tool assembly is in said operative position and having an outlet in fluid communication with said sample receiving chamber;

valve means in said first passageway between the inlet thereof and said sample receiving chamber, said valve means being operable to allow fluid flow through said first passageway only while said tool assembly is in said operative position;

a first pressure recording device in fluid communication with said first passageway and positioned between said sample receiving chamber and said valve means;

means within said tool assembly forming a second fluid passageway separate from said first fluid passageway and having an inlet in continuous fluid communication with the exterior of said tool assembly, said inlet being in fluid communication with said zone by way of said tubular passage of said conduit means when said tool assembly is in said operative position;

a second pressure recording device in fluid communication with said second passageway;

said first fluid passageway of said tool assembly including one annular portion encircling and providing a flow path around said second pressure recording device and another annular portion encircling and providing a flow path around said first pressure recording device;

said coupling means including an annular coupling portion for providing fluid communication between said first fluid passageway of said tool assembly and said annular passage of said conduit means, and said coupling means further including a tubular coupling portion coaxial with and separate from said annular coupling portion for providing fluid communication between said second fluid passageway of said tool assembly and said tubular passage of said conduit means.

2. A well testing apparatus comprising:

a packer assembly adapted to be lowered into a well on tubing or the like to isolate a zone to be tested, said packer assembly having radially expansible packer means for segregating said zone from the portion of the well thereabove;

conduit means carried by said packer assembly and passing coaxially of said apparatus from beneath said packer means through said packer means to terminate thereabove;

said conduit means including:

a tubular, axially extending passage having an inlet below said packer means and an outlet above said packer means, and further including, an annular passage extending coaxially with but separate from and surrounding said tubular passage and having an inlet below said packer means and an outlet above said packer means;

a testing tool assembly adapted to be moved through said tubing on a wire line to an operative position adjacent said packer assembly;

aperture means coaxial with and in the lower end of said tool assembly for sealingly and disengageably receiving the upper end of said conduit means as said tool assembly reaches said operative position;

means forming a sample receiving chamber in said testing tool assembly;

means within said tool assembly forming a first fluid passageway having an inlet in said aperture means and aligned with said conduit means annular passage outlet when said tool assembly is in said operative position and having its outlet in fluid communication with said sample receiving chamber;

a valve in said first passageway between said aperture means and said sample receiving chamber, said valve being operable to allow fluid flow through said first passageway only when said tool assembly is in said operative position;

a first pressure recording device positioned in said first passageway between said valve and said sample receiving chamber;

means within said tool assembly forming a tubular, continuously open second fluid passageway separate from said first fluid passageway and having an inlet in said aperture means and aligned with said conduit means tubular passage outlet when said tool assembly is in said operative position;

a second pressure recording device positioned in said first passageway in fluid communication with said second passageway;

said first fluid passageway of said tool assembly including one annular portion encircling and providing a flow path around said second pressure recording device and another annular portion encircling and providing a flow path around said first pressure recording device;

said outlet of said annular passage of said conduit means and said inlet of said first fluid passageway of said tool assembly defining an axially engageable, annular coupling providing fluid communication between said one annular portion of said first fluid passageway of said tool assembly and said annular passage of said conduit means carried by said packer assembly;

and said outlet of said tubular passage of said conduit means and said inlet of said second fluid passageway of said tool assembly defining an axially engageable, tubular coupling coaxial with but separate from said annular coupling and providing fluid communication between said tubular passage of said conduit means and said second fluid passageway of said tool assembly.

References Cited in the file of this patent

UNITED STATES PATENTS

| | | |
|---|---|---|
| 2,158,569 | Bowen | May 16, 1939 |
| 2,161,233 | O'Neill | June 6, 1939 |
| 2,189,919 | Moore | Feb. 13, 1940 |
| 2,218,155 | Rusler et al. | Oct. 15, 1940 |
| 2,222,829 | Humason et al. | Nov. 26, 1940 |
| 2,623,594 | Sewell | Dec. 30, 1953 |
| 2,846,876 | Willingham | Aug. 12, 1958 |
| 2,947,361 | Hyde | Aug. 2, 1960 |